United States Patent Office 3,441,591
Patented Apr. 29, 1969

3,441,591
PREPARATION OF NITRILES FROM α-UNSATURATED HYDROCARBONS AND HNO₂
Lüdwig Hüter, Weisskirchen, Taunus, Germany, assignor to Deutsche Gold- und Silber-Scheideanstalt vormals Roessler, Frankfurt am Main, Germany
No Drawing. Filed July 30, 1965, Ser. No. 476,205
Claims priority, application Germany, Aug. 6, 1964,
D 45,123
Int. Cl. C07c 121/02
U.S. Cl. 260—464   6 Claims

ABSTRACT OF THE DISCLOSURE

Process for the production of nitriles wherein hydrocarbons containing at least one free —$CH_3$ group or alkyl substituted pyridines are reacted in the gas phase with $HNO_2$ or equilibrium mixtures thereof consisting of $HNO_2$, $N_2O_3$ and $H_2O$ in a catalyst free reaction space at a temperature between 200 and 800° C.

---

The present invention relates to an improved process for the production of nitriles from hydrocarbons which contain at least one free —$CH_3$ group.

It is known that nitriles can be formed from hydrocarbons, especially, from methyl group containing hydrocarbons whose methyl group is in α position to a carbon to carbon double bond with the aid of ammonia either through simultaneous dehydrogenation over a catalyst at elevated temperatures or by simultaneous oxidative dehydrogenation with oxygen or air on specific catalysts by the so-called process of ammonoxidation.

It is also known that hydrocarbons can be converted to nitriles with nitrogen monoxide at elevated temperatures in the presence of a catalyst. For example, according to U.S. Patent No. 2,736,739 high yields of nitrile are obtained by heating extremely pure NO together with hydrocarbons to high temperatures in the presence of an $Ag_2O$ catalyst doped with calcium using about ⅔ of the NO supplied. However, the conversions of the hydrocarbons are relatively low.

Both of these processes have found acceptance as commercial processes. Nevertheless, they both have certain disadvantages, namely, the cost of the catalyst and the difficulty in controlling the reaction which proceeds exothermally on the catalyst. Furthermore, byproducts are formed and despite high yields the conversions are low.

It was not previously known that nitriles could be formed in high yields with nitrogen oxides in which the nitrogen has a valence above that in NO. Evidently the art feared that they would effect a too far reaching oxidation of the hydrocarbons which is evidenced by a predominant total combustion of the hydrocarbons to carbon dioxide and water.

When aqueous nitrous acid is used as the starting point, for example, by forming such acid by treatment of nitriles with an acid and attempts are made to convert it as such into the gas phase by heating for reaction with hydrocarbons, its use as a nitroso group introducing agent is rendered difficult and the results nonspecific not only because of its dehydration but also because of the disproportionation which occurs into nitric acid and thereby into higher nitrogen oxides. According to my own experiments some nitriles are also formed.

According to the invention it was found that nitriles can be produced from hydrocarbons, carrying at least one free —$CH_3$ group, in the gas phase by reaction of such hydrocarbons with nitrous acid or its equilibrium mixture such as obtained from catalytic ammonia oxidation with oxygen and steam. Evidently the reaction progresses according to the following scheme:

$$R-CH_3 + [HNO_2] \xrightarrow{-H_2O} (R-CH_2-NO \rightleftharpoons R-CH=NOH) \xrightarrow{-H_2O} R-CN$$

The hydrocarbons carrying at least one free —$CH_3$ group can be aliphatic hydrocarbons, both saturated and unsaturated, aliphatic aromatic hydrocarbons or cyclo aliphatic hydrocarbons. Heterocyclic compounds, such as, alkyl substituted pyridines also come into question. Hydrocarbons carrying a methyl group in α position to a carbon to carbon double bond are especially suited. The process according to the invention is not limited to reactions with individual hydrocarbons but can also be applied to hydrocarbon mixtures, such as, petroleum fractions.

Examples of suitable starting hydrocarbons and heterocyclics, for instance, are: methane, ethane, propane, propylene, isobutylene, symmetrical 1,2-butene, 1-methylcyclohexene, toluene, xylenes, methylnaphthalenes, the picolines, the lutidines, gasoline, diesel oils and heating oils.

Higher reaction temperatures of about 600 to 750° C. are required for the less reactive hydrocarbons, such as, the saturated aliphatic hydrocarbons. Lower temperatures can be used with the more reactive unsaturated hydrocarbons or methyl substituted aromatics.

The nitrous acid is used in the form of its vapor, preferably, in the form of its equilibrium mixture as it is obtained in the oxidation of ammonia with air and water or water containing air over catalysts. The equilibrium mixture referred to is intended to signify the following equilibrium:

$$2HNO_2 \rightleftharpoons N_2O_3 + H_2O$$

An ammonia combustion mixture derived from molar oxygen to ammonia ratio of 1.25 to 1.50:1 is especially suited.

The ammonia oxidation as is known is carried out with noble metals, such as, platinum-rhodium and/or with heavy metal oxides, such as, iron, cobalt or molybdenum oxides, if desired, mixed with bismuth oxides, as catalyst. Nitrogen oxide yields of 95–98% are obtained.

The hydrocarbons and the nitrous acid are in general united with intensive mixing at temperatures between 200 and 800° C., preferably, between 350 and 650° C. Tubes can be used as the reaction vessels, which, if desired, can be given special shapes or be provided with inserts to reduce the velocity of gas flow therethrough.

Preferably the freshly produced gases of the ammonia oxidation are mixed in a tube directly behind the ammonia converter with the hydrocarbon at such a high velocity of flow that the linear reaction velocity of the gas mixture is lower and the mixture is reacted in a period of a fraction of a second to several seconds.

The mixture of the reactants is effected in a known manner, for example, by injection or high flow velocity. The reaction itself is caried out at lower velocities of flow, for example, by passing the gas mixture over flow retarders, such as, baffle plates, or filling materials or by increasing the cross-section of the reaction vessel.

Known dehydration catalysts, such as, aluminum oxide which, if desired, has been coated with phosphates or silica gel which, if desired, has been impregnated with phosphoric acid can be used as the filling materials.

The hydrocarbons themselves can have any desired temperature when they are introduced into the reaction vessel. Advantageously, however, they are at such a temperature that upon mixture with the hot fresh gases from the ammonia converter the desired reaction temperature of 200 to 800° C. is obtained in the mixture. The higher the quantities of the hydrocarbons the higher their temperature should be and conversely the lower the quantities of the hydrocarbons the lower their temperature.

The proportion of the hydrocarbons and the nitrous acid is adjusted so that at most one equivalent of ammonia which has been oxidized is provided per methyl group. It was found advantageous to provide a quantity of hydrocarbon which is somewhat larger than the equivalent quantity, namely, up to about 1.5 equivalents.

The pressure at which the reaction is carried out is not critical. Atmospheric pressure is most advantageous but the reaction can also be carried out at subatmospheric or superatmospheric pressures.

The technical advantage of the process according to the invention over the previously known processes is that the reaction between the nitrous acid and the hydrocarbon proceeds in the absence of a catalyst. As a consequence, all of the difficulties which, as is known, occur in controlling an exothermic catalytic reaction are avoided. The temperatures are therefore very easy to control. Also starting gases of low purity may be employed.

Furthermore, the use of an excess of ammonia is not necessary. The ammonia supplied is completely utilized for the reaction and accordingly the danger of its decomposition to nitrogen and hydrogen is avoided. This not only causes an increase in the yields but also an increase in the conversion within the process even without use of additional complex catalyst systems.

The success of the process according to the invention probably can be explained upon the new reaction scheme given above. In the above described reaction of hydrocarbons with ammonia with simultaneous oxidative dehydrogenation (ammonia oxidation), the formation of aldehydes or respectively aldimines (by condensation of aldehyde and $NH_3$) as preliminary or intermediate products which are dehydrogenated by the catalysts to the nitriles or which are dehydrated by additional oxidation plays a decisive role.

As is known, the ammonia oxidation as is carried out in large commercial scale for the production of $HNO_3$ is explained from a kinetic point of view by various mechanisms. In this connection reference is made to the views of Bodenstein and coworkers (see Z. Elektrochem., 36, 756, 1930) who found high yields of intermediately formed nitrous acid directly behind the noble metal catalyst, so to say in statu nascendi, which naturally at the high temperature of formation is only in existence for a short time, according to the following summation equation:

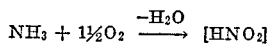
$$NH_3 + 1\tfrac{1}{2}O_2 \xrightarrow{-H_2O} [HNO_2]$$

It is self-understood that it is not claimed that the nitrous acid is stable over a longer period of time in the gas phase. It, however, is considered that the nitrous acid which occurs for a short time undergoes a radical decomposition at high temperatures and therefore is in the position, for example, directly behind the ammonia converter to form nitrosyl radicals (NO°) in high concentrations.

The following example will serve to illustrate the process of the invention.

Example

A gas mixture consisting of 13 vol. percent of $NH_3$ and 19.5 vol. percent of oxygen and the remainder steam was introduced at 150° to 200° C. into an ammonia oxidation furnace in which the oxidation of the $NH_3$ to nitrous acid was continuously effected on heated platinum-rhodium nettings at 800–900° C.

In each of the following tests 100 liters per hour, calculated under normal conditions, were taken directly from the gas stream leaving the reaction before the nitrous gases were quenched, as usual, in heat exchangers, to normal temperatures for condensation and absorption for the purpose of producing $HNO_3$ and mixed directly with the hydrocarbon in question which had been premixed with a small optional amount of steam.

The hydrocarbon and quantity supplied in each test per hour was as follows:

|     | Grams |
| --- | --- |
| (a) Pure propylene | 63 |
| (b) Pure isobutylene | 112 |
| (c) Pure o-xylene | 69 |

The gases were reacted in a mixing and reaction zone within the temperature range of 470°–530° C. for a total of 6 seconds. The gases were then quenched, condensed and washed with a little acidified water. After fractionation of the condensed nitriles and purification the following analytical data was obtained:

| Yield | Conversion*, percent |
| --- | --- |
| (a) 88.2% of acrylonitrile, 1.5% of acetonitrile | 38.7 |
| (b) 85.4% of methacrylonitrile, 2.2% of acetonitrile | 29.0 |
| (c) 91.1% of o-phthalodinitrile, 1.9% of tolyl nitrile | 89.5 |

* Conversion with reference to hydrocarbon supplied.

Small quantities of HCN, CO, $CO_2$ and unsaturated aldehyde were also obtained as byproducts.

I claim:
1. A process for the production of a nitrile which comprises reacting a hydrocarbon containing a free —$CH_3$ group in α position to a carbon to carbon double bond in the gas phase with a material selected from the group consisting of $HNO_2$ and equilibrium mixtures thereof consisting of $HNO_2$, $N_2O_3$ and $H_2O$ in a catalyst free reaction space at a temperature between about 200 and 800° C.

2. The process of claim 1 in which said hydrocarbon is selected from the group consisting of propylene, isobutylene, 1,2-butene, 1-methyl cyclohexene, toluene, xylenes and methyl naphthalenes.

3. The process of claim 1 in which said reaction is carried out at a temperature between about 350 and 650° C. at atmospheric pressure.

4. The process of claim 1 in which said material reacted with the hydrocarbon is a hot gas mixture directly obtained from the catalytic oxidation of ammonia with molecular oxygen and steam in another reaction space.

5. The process of claim 4 in which the molar ratio of oxygen to ammonia in said ammonia oxidation is between 1.25 to 1.50:1.

6. The process of claim 5 in which at most only one equivalent of ammonia is supplied for the ammonia oxidation per methyl group of the hydrocarbon.

References Cited

UNITED STATES PATENTS 2,736,739  2/1956  England et al. _____ 260—465
3,324,166  6/1967  Sennewald et al. ____ 260—465.3

FOREIGN PATENTS 488,830  12/1952  Canada.
1,288,404  2/1962  France.
273,224  1/1964  Australia.

OTHER REFERENCES

Journal of Chemical Physics, vol. 39, No. 2, pp. 432–435.

Thorne et. al.: Inorganic Chemistry, pp. 668–675 and p. 684.

CHARLES B. PARKER, *Primary Examiner.*

S. T. LAWRENCE III, *Assistant Examiner.*

U.S. Cl. X.R.

260—294.9, 465, 465.3